(12) United States Patent
Yamase

(10) Patent No.: US 8,210,952 B2
(45) Date of Patent: Jul. 3, 2012

(54) UNIVERSAL JOINT

(75) Inventor: Tohru Yamase, Iwata (JP)

(73) Assignee: NTN Corporation, Osaka (JP)

( * ) Notice: Subject to any disclaimer, the term of this patent is extended or adjusted under 35 U.S.C. 154(b) by 325 days.

(21) Appl. No.: 12/531,112

(22) PCT Filed: Feb. 27, 2008

(86) PCT No.: PCT/JP2008/053398
§ 371 (c)(1),
(2), (4) Date: Sep. 14, 2009

(87) PCT Pub. No.: WO2008/117616
PCT Pub. Date: Oct. 2, 2008

(65) Prior Publication Data
US 2010/0022316 A1    Jan. 28, 2010

(30) Foreign Application Priority Data
Mar. 27, 2007 (JP) ................................ 2007-082393

(51) Int. Cl.
*F16D 3/205* (2006.01)
(52) U.S. Cl. ........................................ 464/111; 464/905
(58) Field of Classification Search .................. 464/111, 464/122–124, 905; 384/564
See application file for complete search history.

(56) References Cited

U.S. PATENT DOCUMENTS

| | | | | |
|---|---|---|---|---|
| 1,630,339 | A * | 5/1927 | Ganster | 384/564 |
| 3,593,541 | A | 7/1971 | Kuroda | |
| 4,224,806 | A * | 9/1980 | Kobayashi | 464/111 |
| 5,951,401 | A * | 9/1999 | Kita et al. | 464/124 X |
| 6,168,529 | B1 | 1/2001 | Moulinet | |
| 6,572,481 | B1 | 6/2003 | Margerie | |
| 6,764,407 | B2 * | 7/2004 | Goto et al. | 464/111 |
| 2003/0073501 | A1 | 4/2003 | Goto et al. | |
| 2007/0004522 | A1 * | 1/2007 | Ishijima et al. | 464/111 |

FOREIGN PATENT DOCUMENTS

| | | |
|---|---|---|
| FR | 2 790 050 | 8/2000 |
| GB | 1 231 174 | 5/1971 |
| JP | 09-280263 | 10/1997 |
| JP | 2000-074085 | 3/2000 |
| JP | 2000-510555 | 8/2000 |
| JP | 2003-97589 | 4/2003 |

OTHER PUBLICATIONS

International Search Report dated Apr. 1, 2008 for International Application No. PCT/JP2008/053398.
Advances in Engineering Series No. 7, "Universal Joint and Driveshaft Design Manual", (US), the Society of Automotive Engineers, Inc., p. 138.
International Preliminary Report on Patentability and Written Opinion of the International Searching Authority dated Oct. 29, 2009 in International (PCT) Application No. PCT/JP2008/053398.
Supplementary European Search Report issued Oct. 19, 2011 in corresponding European Patent Application No. 08720946.6.

* cited by examiner

*Primary Examiner* — Gregory Binda
(74) *Attorney, Agent, or Firm* — Wenderoth, Lind & Ponack, LLP

(57) ABSTRACT

A pod type universal joint has a roller assembly rotatably carried by a number of trunnion journals. The roller assembly includes a spherical roller having its outer peripheral surface of a true sphere-shape and needle rollers arranged between the spherical roller and each of the trunnion journals. A raceway for the needle rollers and flanges for restricting an axial movement of the needle rollers are formed on an outer periphery of each of the trunnion journals. A projection beyond the circumscribing circle of the needle rollers is provided on the outer periphery of the tip end of each of the trunnion journals by performing plastic working on the tip end surface of each of the trunnion journals.

7 Claims, 6 Drawing Sheets

UNIVERSAL JOIN

TECHNICAL FIELD

The present invention relates to a universal joint such as a tripod type plunging constant velocity universal joint, which can be used in a power transmission device for an automobile or various industrial machines.

BACKGROUND ART

In a drive shaft of a front-wheel drive vehicle and an independent suspension type rear-wheel drive vehicle, a plunging constant velocity universal joint is used for allowing angular displacement and axial displacement. As illustrated in FIG. 5, the conventional general tripod type plunging constant velocity universal joint includes, as main components, an outer race 110 as an outer joint member, a spider 120 as an inner joint member, and a roller assembly 130 as a torque transmitting element.

The outer joint member 110 includes a mouth portion 112 and a stem portion 116, and a spline (or serration, the same is applied in the following) shaft 118 of the stem portion 116 is coupled to one of two shafts to be connected so as to transmit torque. The mouth portion 112 is cup-like shaped having one open end, and has an inner periphery along which track grooves 114 are formed, a side wall of each of the track grooves 114 serving as a roller guiding surface.

As illustrated in FIG. 6, the spider 120 includes a boss 122 and trunnion journals 126. The boss 122 has a spline hole 124 for being coupled, so as to transmit torque, to the other of the two shafts to be connected. FIGS. 5 and 6 illustrate only one trunnion journal 126. However, for example, three (tripod type) or two (bipod type) trunnion journals 126 are arranged in a circumferential direction of the boss 122 at equal intervals.

Each of the trunnion journals 126 carries the roller assembly 130. Each roller assembly 130 includes a spherical roller 132, needle rollers 134, an inner washer 136, and an outer washer 138. The needle rollers 134 are interposed between an outer peripheral surface of the trunnion journal 126 and an inner peripheral surface of the spherical roller 132 so as to roll therebetween. Therefore, the spherical roller 132 can rotate and axially move with respect to the trunnion journal 126.

The inner washer 136 and the outer washer 138 are arranged at opposite ends in the axial direction of the needle rollers 134. The inner washer 136 has a ring shape, and is interposed between the boss 122 of the spider 120 and end surfaces of the needle rollers 134. The outer washer 138 has an approximately L-shaped cross-section, and includes an axially-extending cylindrical portion 140 and a disk portion 142 extending radially inward from one end portion of the cylindrical portion 140. The other end portion of the cylindrical portion 140 is bent radially outward, and a bent portion 144 has an outer diameter which is larger than an inner diameter of the spherical roller 132. In the vicinity of a tip end of the trunnion journal 126, a peripheral groove 128 is formed. A round circlip 146 is attached in the peripheral groove 128, whereby the movement of the outer washer 138 toward the tip end of the trunnion journal 126 is regulated. Therefore, an inner diameter of the disk portion 142 of the outer washer 138 is smaller than an outer diameter of the round circlip 146. Further, an outer diameter of the cylindrical portion 140 is equal to or smaller than a diameter of a circumscribed circle of the needle rollers 134. Thus, the bent portion 144 of the outer washer 138 prevents the spherical roller 132 from slipping off toward the tip end of the trunnion journal 126.

Aside from the above-mentioned general tripod type plunging constant velocity universal joint, Non-Patent Document 1 describes a tripod type plunging constant velocity universal joint in which the trunnion journal is provided with a flange for receiving the end surfaces of the needle rollers, and the inner washer, the outer washer, and the round circlip are eliminated. That is, as illustrated in FIG. 7, a raceway 128 for the needle rollers 134 is formed along the outer periphery of the trunnion journal 126, and flanges 128a and 128b are formed on opposite ends of the raceway 128. The axial movement of the needle rollers 134 is regulated by the flanges 128a and 128b. In this case, the spherical roller 132 is structured so as to slip off when moving to the tip end portion of the trunnion journal 126. That is, the outer peripheral surface of the trunnion journal 126 has a diameter which is smaller than a diameter of the circumscribed circle of the needle rollers 134 and smaller than a diameter of the inner peripheral surface of the spherical roller 132.

In Patent Document 1, there is proposed provision of the outer washer so as to prevent the slipping off of the spherical roller of the tripod type plunging constant velocity universal joint described in Non-Patent Document 1.

Patent Document 1: JP 2000-510555 A

Non-patent Document 1: Advances in Engineering Series No. 7, "Universal Joint and Driveshaft Design Manual", (US), The Society of Automotive Engineers, Inc., p. 138

SUMMARY OF THE INVENTION

Problem to be Solved by the Invention

An object of the present invention is to prevent, without increasing the number of components, a spherical roller from slipping off even when moving to a tip end side of a trunnion journal.

Means for Solving the Problem

The present invention has solved the problem by providing a protrusion on a tip end portion of the trunnion journal. That is, according to the present invention, there is provided a universal joint which comprises:

an outer joint member in which tracks extending axially are formed at equiangular positions of an inner periphery thereof;

an inner joint member having trunnion journals protruding radially from the equiangular positions thereof; and a roller assembly rotatably carried by each of the trunnion journals, wherein:

the roller assembly comprises a spherical roller having a spherical outer peripheral surface and a plurality of needle rollers arrayed between the trunnion journal and the spherical roller;

each of the trunnion journals has an outer periphery in which a raceway for the needle rollers and flanges for regulating axial movement of the needle rollers are formed; and a protrusion beyond a circumscribed circle of the needle rollers is provided on an outer periphery of a tip end of each of the trunnion journals by performing plastic working on a tip end surface of the trunnion journals.

Plastic working of the protrusion is performed after the spherical roller is assembled. The protrusion beyond the circumscribed circle of the needle rollers is provided on the tip end outer periphery of the trunnion journal, and hence the protrusion interferes with the spherical roller when the spherical roller is moved to the tip end side of the trunnion journal, whereby the spherical roller does not easily slip off. This interference allowance can be appropriately set by changing a protruding height and the number of the protrusion. Therefore, it is possible to appropriately select specifications. For example, it is possible to adopt a specification in which the spherical roller can be detached even after once being assembled, or a specification in which the spherical roller can not be detached after once being assembled.

The present invention is applicable to a pod type plunging constant velocity universal joint having an outer race as an outer joint member, a spider as an inner joint member, and a roller assembly as a torque transmitting element. Examples of the pod type joint are a tripod joint having three trunnion journals and a bipod joint having two trunnion journals.

EFFECTS OF THE INVENTION

According to the present invention, it is possible to achieve the object that the spherical roller is prevented from slipping off even when being moved to the tip end side of the trunnion journal, whereby it is possible to reduce, because the inner washer, the outer washer, and the round circlip are unnecessary, the number of components, and a resultant cost reduction is possible.

Further, the spherical roller does not easily slip off, and hence unit handling, that is, handling in the state of so-called tripod kit in which the roller assembly is assembled to the trunnion journal of the spider is possible, whereby transportation and an assembly operation can be facilitated.

Figure 1A:
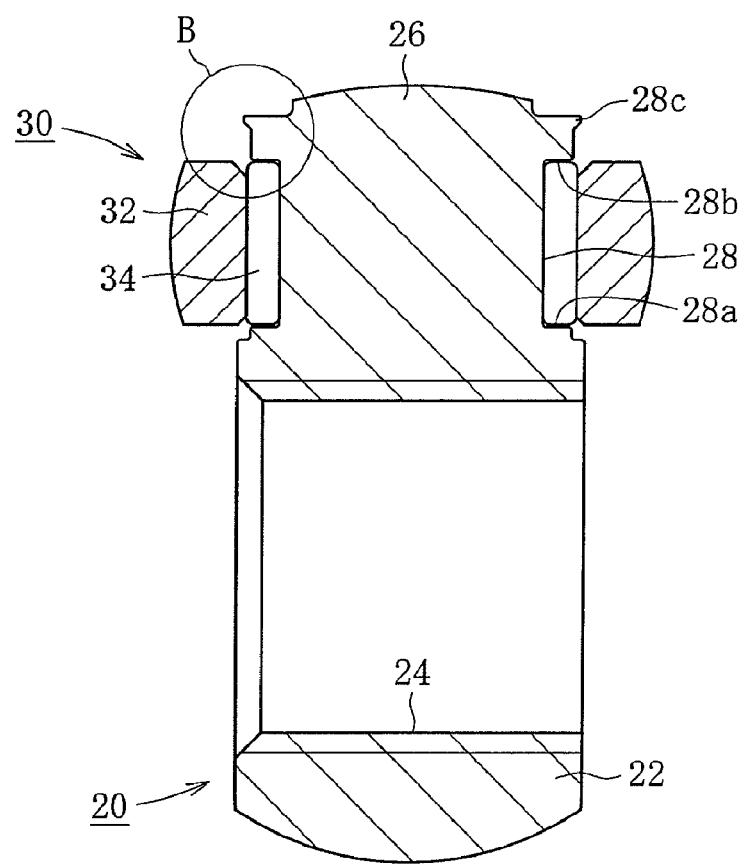
FIG. 1A is a sectional view of a tripod kit according to an embodiment of the present invention.

DESCRIPTION OF SYMBOLS 20 spider
22 boss
24 spline hole
26 trunnion journal
28 raceway
28a and 28b flange
28c protrusion
30 roller assembly (torque transmitting element)
32 spherical roller
34 needle roller

DETAILED DESCRIPTION OF THE INVENTION

Figure 5:
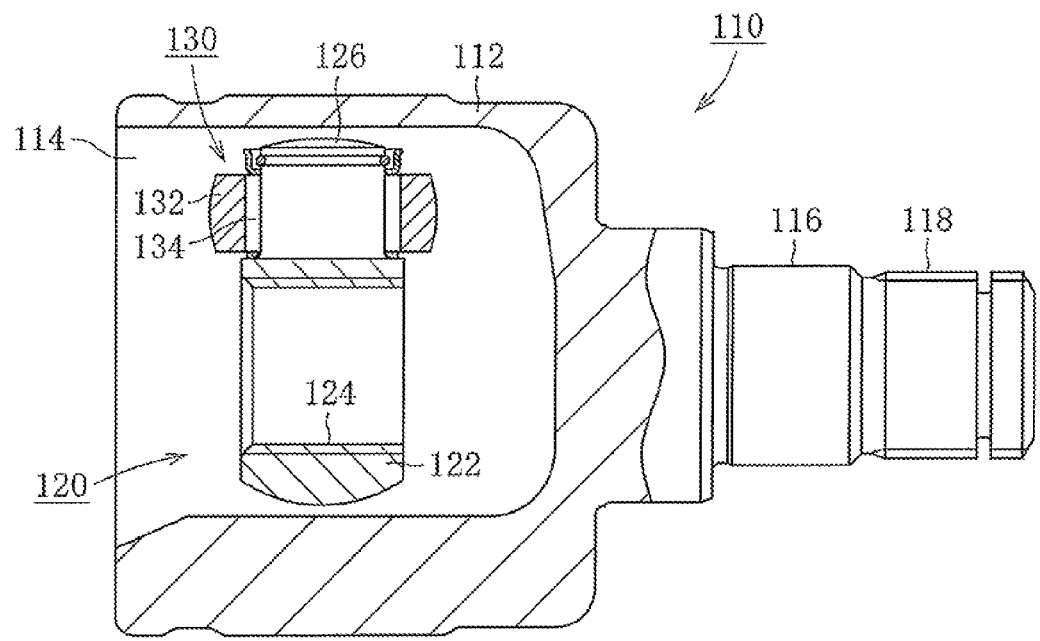
FIG. 5 is a longitudinal sectional view of a conventional tripod type constant velocity universal joint.
Figure 6:
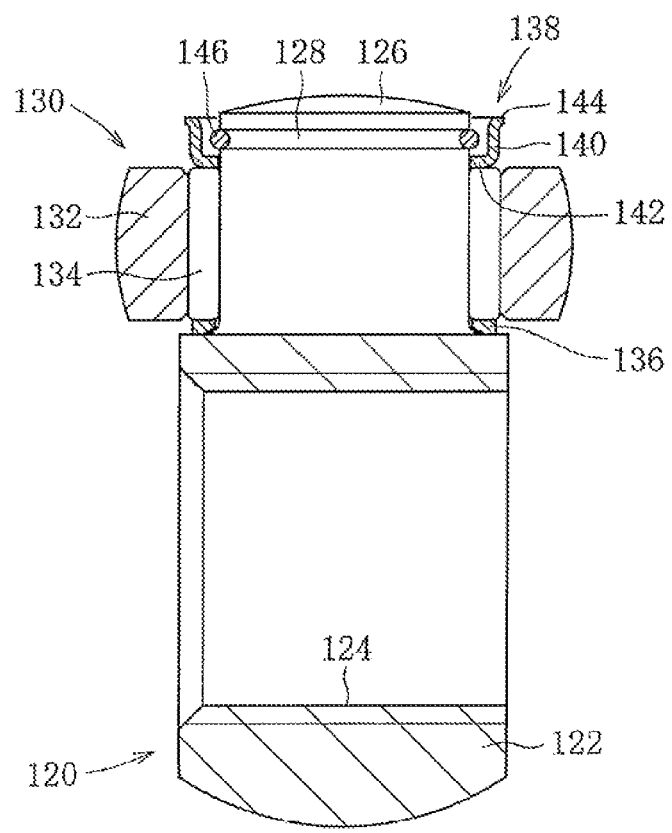
FIG. 6 is an enlarged view of a tripod kit of FIG. 5.
Figure 7:
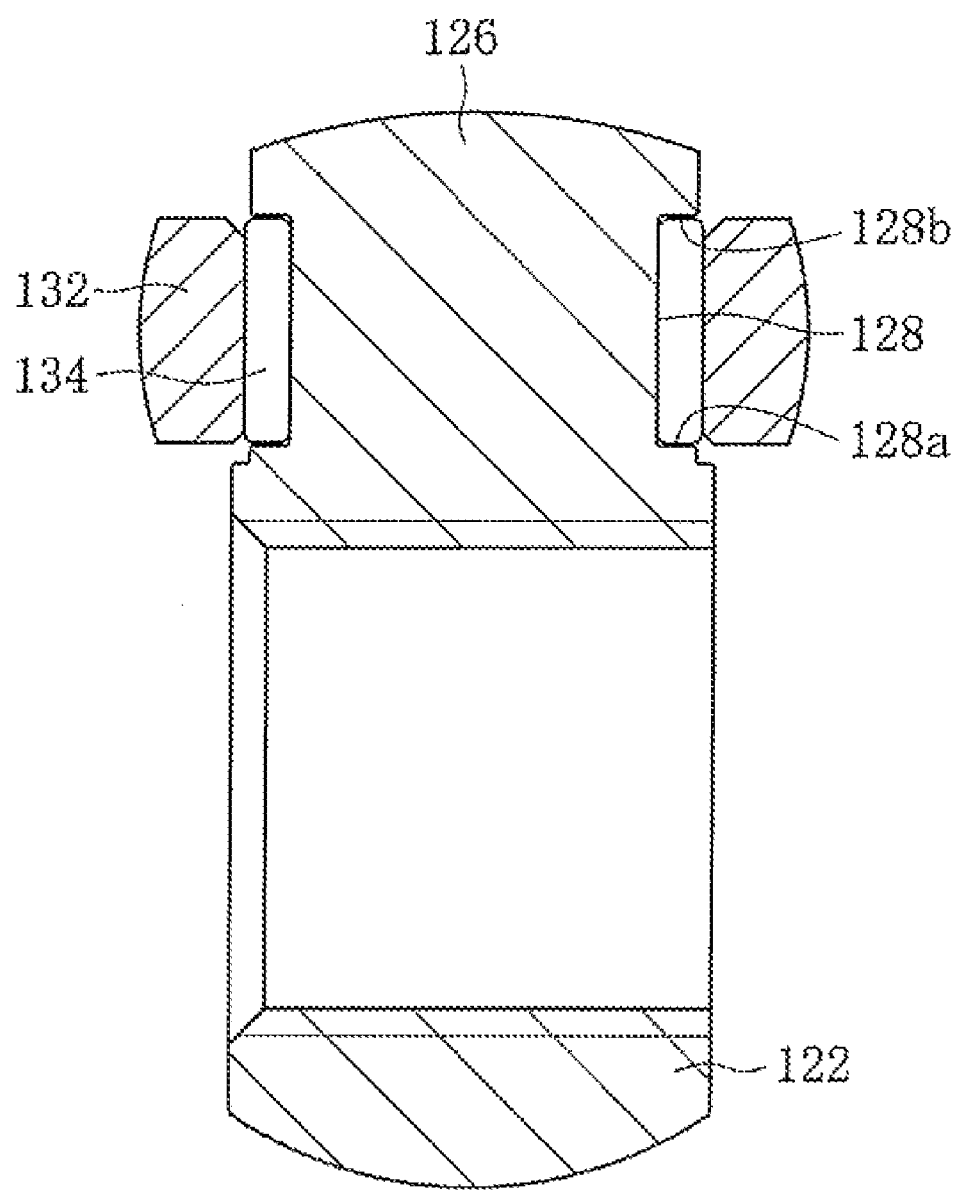
FIG. 7 is a longitudinal sectional view similar to FIG. 6, illustrating another conventional technology.

Hereinafter, embodiments of the present invention will be described with reference to the drawings. Note that an outer race is basically the same as that of the conventional tripod type constant velocity universal joint described in relation to FIG. 5. Therefore, hereinafter, a tripod kit excluding the outer race, that is, a unit of a spider and a roller assembly will mainly be described.

Figure 1B:
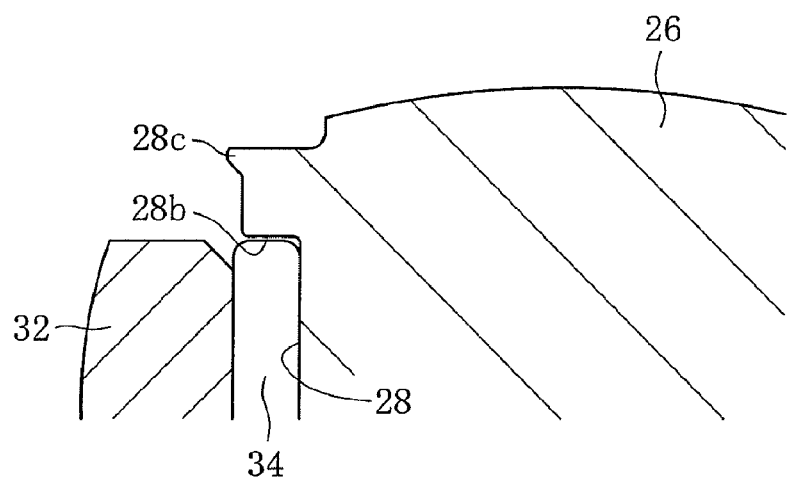
FIG. 1B is an enlarged view of a portion B of FIG. 1A.

An embodiment illustrated in FIGS. 1A and 1B is an example of the tripod type constant velocity universal joint, and the tripod kit includes a spider 20 as an inner joint member and a roller assembly 30 as a torque transmitting element.

The spider 20 includes a boss 22 and trunnion journals 26, the spider 20 being coupled to a shaft or the like through a spline hole 24 formed in the boss 22 so as to transmit torque. The tripod kit includes an inner joint member having trunnion journals 26 protruding radially from the equiangular positions thereof; and a roller assembly rotatably carried by each of the trunnion journals 26 protrude radially from circumferentially-trisected positions of the boss 22. On the outer periphery trunnion journal 26, there is formed a cylindrical raceway 28 along which needle rollers 34 roll. Wall surfaces at opposite axial ends of the raceway 28 constitute flanges 28a and 28b for receiving end surfaces of the needle rollers 34 arranged in the raceway 28.

Each roller assembly 30 includes a spherical roller 32 and a plurality of needle rollers 34. The spherical roller 32 has a cylindrical inner peripheral surface and a spherical outer peripheral surface. The needle rollers 34 have columnar shapes, and are arrayed so as to roll between the inner peripheral surface of the spherical roller 32 and the raceway 28 of the trunnion journal 26. Thus, a so-called full complement roller bearing without a retainer is constituted in which the raceway 28 of the trunnion journal 26 serves as an inner race and the inner peripheral surface of the spherical roller 32 serves as an outer race. Accordingly, the spherical roller 32 can rotate and axially move with respect to the trunnion journal 26. The outer peripheral surface of the spherical roller 32 comes into contact with a roller guiding surface of an outer joint member.

A protrusion 28c is formed at a tip end portion of the trunnion journal 26. The protrusion 28c is beyond a circumscribed circle of the needle rollers 34 arranged in the raceway 28. In other words, the protrusion 28c is beyond the inner diameter of the spherical roller 32. Accordingly, by the existence of the protrusion 28c, the spherical roller 32 interferes with the protrusion 28c when moving to the tip end side of the trunnion journal 26. Therefore, the spherical roller 32 does not slip off. The amount of axial movement of the spherical roller 32 is defined by the boss 22 and the protrusion 28c.

The trunnion journal 26 is caused to protrude radially by performing plastic working on the tip end surface of the trunnion journal 26, whereby the protrusion 28c is formed. Of the outer peripheral surface of the trunnion journal 26, a surface-hardened layer formed by induction quenching is formed only on a portion constituting a raceway surface on which the needle rollers roll, and plastic working is performed on an unhardened portion remained in the tip end portion of the trunnion journal 26.

Figure 2A:
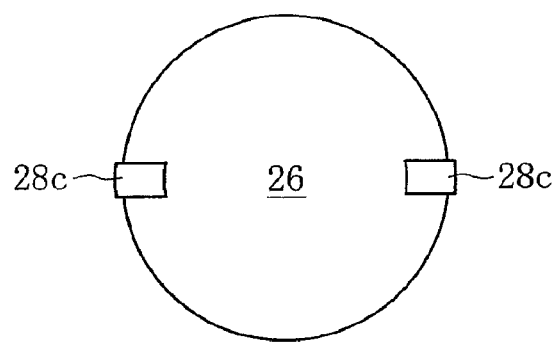
FIG. 2A is an end view of a trunnion journal according to the embodiment of FIG. 1A, illustrating two point protrusions.
Figure 2B:
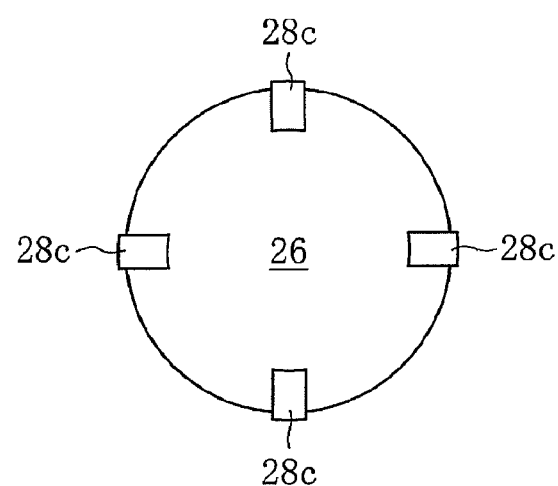
FIG. 2B is an end view of the trunnion journal according to the embodiment of FIG. 1A, illustrating an example of four point protrusions.
Figure 2C:
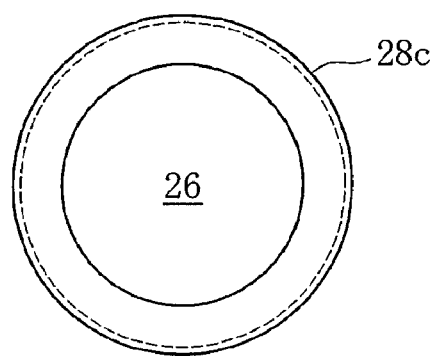
FIG. 2C is an end view of the trunnion journal according to the embodiment of FIG. 1A, illustrating an example of an entire-periphery protrusion.

In the embodiment illustrated in FIG. 1A and FIG. 1B, the plastic working is performed on the tip end surface of the trunnion journal 26 by applying a jig (not shown) axially. The protrusion 28c may be one or more protrusions which are arranged at predetermined intervals in a circumferential direction of the trunnion journal 26, or a protrusion continuous over a whole circumference of the trunnion journal 26. FIG. 2A illustrates an example of two point protrusions, FIG. 2B illustrates an example of four point protrusions, and FIG. 2C illustrates an example of a continuous protrusion.

Figure 3A:
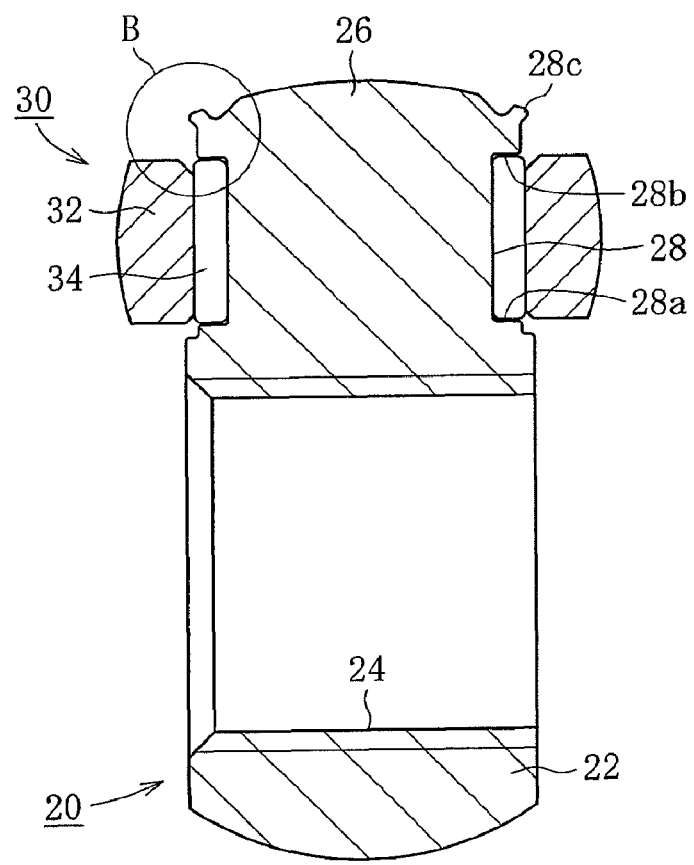
FIG. 3A is a sectional view of a tripod kit according to another embodiment.
Figure 3B:
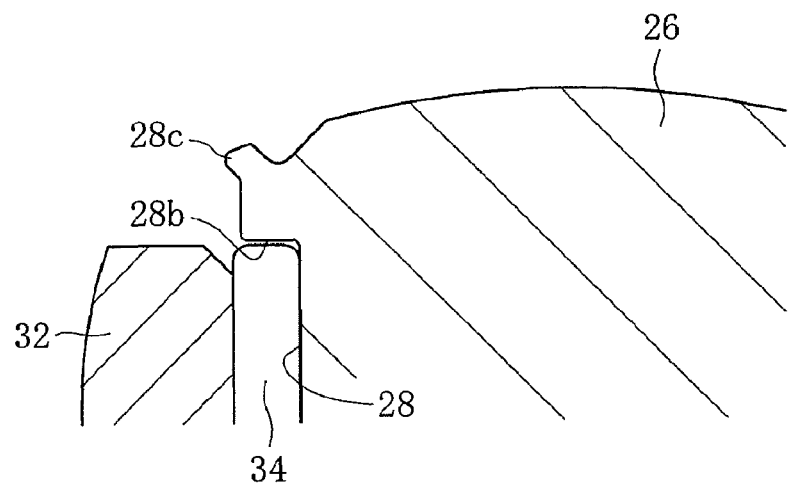
FIG. 3B is an enlarged view of a portion B of FIG. 3A.
Figure 4A:
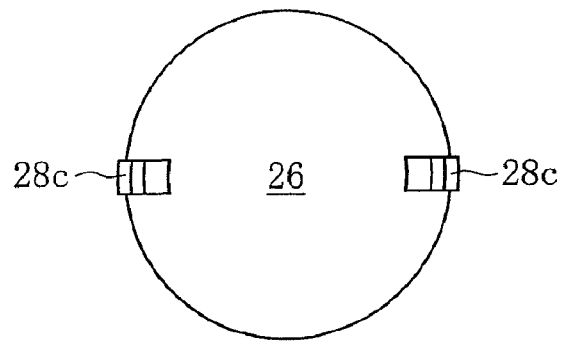
FIG. 4A is an end view of the trunnion journal according to the embodiment of FIG. 3A, illustrating an example of two point protrusions.
Figure 4B:
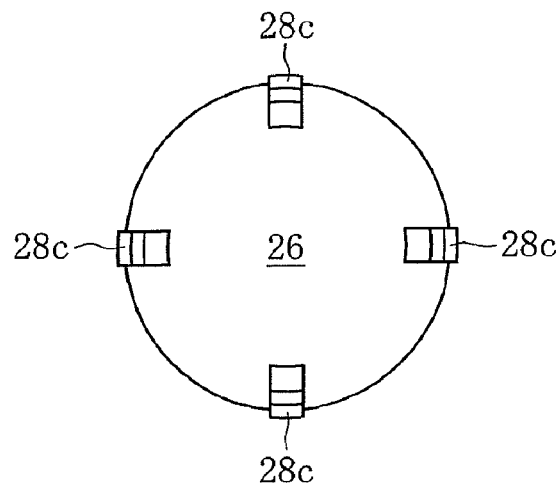
FIG. 4B is an end view of the trunnion journal according to the embodiment of FIG. 3A, illustrating an example of four point protrusions.
Figure 4C:
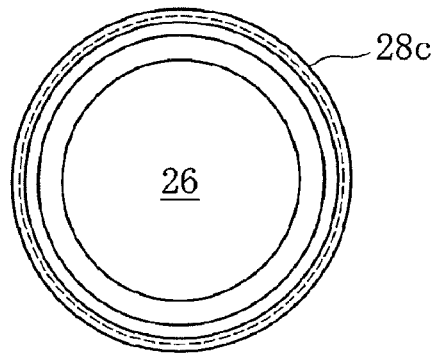
FIG. 4C is an end view of the trunnion journal according to the embodiment of FIG. 3A, illustrating an example of an entire-periphery protrusion.

In the embodiment illustrated in FIG. 3A and FIG. 3B, the plastic working is performed with the jig (not shown) being applied more obliquely outwardly compared with the case of FIGS. 1A and 1B. Also in this case, FIG. 4A illustrates an example of the two point protrusions, FIG. 4B illustrates an example of the four point protrusions, and FIG. 4C illustrates an example of the continuous protrusion.

The protrusion beyond the circumscribed circle of the needle rollers is provided on the outer periphery of the tip end of the trunnion journal 26, and hence the protrusion 28c interferes with the spherical roller 32 when the spherical roller 32 is moved to the tip end side of the trunnion journal 26. Therefore, the spherical roller 32 does not easily slip off. This interference allowance can be set appropriately by changing a protruding height and the number of the protrusion 28c. Therefore, appropriate selection is possible. For example, it is possible to adopt a specification in which the spherical roller 32 can be detached even after once being assembled, or a specification in which it can not be detached after once being assembled. Generally, the plastic working on the protrusion 28c is performed after the assembling of the spherical roller 32. However, depending on setting of the interference allowance, it is also possible to assemble the spherical roller 32 after the plastic working by making use of elastic deformation of the protrusion 28c.

In the case where the spherical roller 32 is caused, in being assembled to the trunnion journal 26, to surmount the protrusion 28c by making use of the elastic deformation of the protrusion 28c, a protruding amount of the protrusion 28c represented by a formula $\Phi D - \Phi d$ where $\Phi d$ is an inner diameter of the spherical roller 32 and $\Phi D$ is an outer diameter of the protrusion 28c, is set so as to allow the spherical roller 32 to be forcively fitted and not to easily slip off after once being forcively fitted. As a specific example, the protruding amount in a range of 0.05 mm to 0.20 mm is preferable.

In the above description, the tripod type plunging constant velocity universal joint is exemplified. However, the bipod type is basically the same as the above except that the number of trunnion journals is changed from three to two.

The invention claimed is:

1. A universal joint, comprising:
an outer race in which tracks extending axially are formed at equiangular positions of an inner periphery thereof;
a spider having a plurality of trunnion journals protruding radially from equiangular positions thereof; and
a plurality of roller assemblies, each of which is rotatably carried by one of the trunnion journals, wherein:
each of the roller assemblies comprises a spherical roller having a spherical outer peripheral surface and a plurality of needle rollers arrayed between the one of the trunnion journals and the spherical roller;
each of the trunnion journals has an outer periphery in which a raceway for the needle rollers and flanges for regulating axial movement of the needle rollers are formed; and
each of the trunnion journals has integrally formed from an outer periphery of a tip end thereof at least one protrusion that extends beyond an inner circumference of the spherical roller.

2. A universal joint according to claim 1, wherein the spider has three of the trunnion journals.

3. A universal joint according to claim 1, wherein the spider has two of the trunnion journals.

4. A universal joint according to claim 1, wherein the outer periphery of the tip end of each of the trunnion journals is plastic worked to form the at least one protrusion.

5. A universal joint according to claim 1, wherein the at least one protrusion of each of the trunnion journals is a protrusion that is continuous over a whole circumference of the trunnion journal.

6. A universal joint according to claim 1, wherein the at least one protrusion of each of the trunnion journals is a plurality of protrusions that are equally spaced apart from each other in a circumferential direction of the trunnion journal.

7. A universal joint according to claim 1, wherein the at least one protrusion of each of the trunnion journals is elastically deformable to allow the spherical roller over the at least one protrusion.

* * * * *